US012140891B2

(12) United States Patent
Narahara et al.

(10) Patent No.: US 12,140,891 B2
(45) Date of Patent: Nov. 12, 2024

(54) IMAGE FORMING APPARATUS AND METHOD FOR CONTROLLING SAME

(71) Applicant: Canon Kabushiki Kaisha, Tokyo (JP)

(72) Inventors: Takashi Narahara, Shizuoka (JP); Ryo Morihara, Keppel Bay Drive (SG); Yutaka Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/328,819

(22) Filed: Jun. 5, 2023

(65) Prior Publication Data

US 2023/0314989 A1 Oct. 5, 2023

Related U.S. Application Data

(63) Continuation of application No. 17/678,279, filed on Feb. 23, 2022, now Pat. No. 11,709,445.

(30) Foreign Application Priority Data

Feb. 25, 2021 (JP) ................................ 2021-029171

(51) Int. Cl.
*G03G 15/20* (2006.01)
*G03G 15/00* (2006.01)

(52) U.S. Cl.
CPC ..... *G03G 15/2039* (2013.01); *G03G 15/5041* (2013.01)

(58) Field of Classification Search
CPC ........... G03G 15/2039; G03G 15/2042; G03G 15/2046; G03G 15/205
See application file for complete search history.

(56) References Cited

U.S. PATENT DOCUMENTS

| | | | | |
|---|---|---|---|---|
| 11,709,445 | B2 * | 7/2023 | Narahara ........... | G03G 15/5041 399/49 |
| 2014/0270835 | A1 * | 9/2014 | Umezawa .......... | G03G 15/2042 399/69 |
| 2015/0160593 | A1 * | 6/2015 | Masumoto ......... | G03G 15/2039 399/69 |
| 2016/0313683 | A1 | 10/2016 | Nishizawa et al. | |
| 2019/0332042 | A1 | 10/2019 | Okayasu et al. | |

(Continued)

FOREIGN PATENT DOCUMENTS

| | | |
|---|---|---|
| JP | 2015114510 A | 6/2015 |
| JP | 2019197169 A | 11/2019 |

(Continued)

*Primary Examiner* — Carla J Therrien
(74) *Attorney, Agent, or Firm* — Venable LLP

(57) ABSTRACT

Disclosed is an image forming apparatus including: a fixation unit configured to heat a toner image formed corresponding to image data and fix the heated toner image onto a recording material; and a control unit configured to determine a fixation target temperature used by the fixation unit to heat the toner image on the basis of the image data, wherein the control unit performs a first determination to calculate a first target temperature on the basis of image density information in each of a plurality of regions in which the image data is divided in a main-scanning direction and a sub-scanning direction and a second determination to determine whether the image data is a text image, and determines the fixation target temperature on the basis of results of the first determination and the second determination.

5 Claims, 14 Drawing Sheets

(56) References Cited

U.S. PATENT DOCUMENTS

| | | | | |
|---|---|---|---|---|
| 2019/0346796 | A1* | 11/2019 | Imaizumi ........... | G03G 15/2039 |
| 2020/0310308 | A1 | 10/2020 | Jinkoma | |
| 2020/0310310 | A1 | 10/2020 | Shinji et al. | |
| 2020/0379383 | A1 | 12/2020 | Akamatsu | |
| 2021/0063924 | A1 | 3/2021 | Ito et al. | |
| 2021/0191294 | A1 | 6/2021 | Nishida et al. | |

FOREIGN PATENT DOCUMENTS

| | | | |
|---|---|---|---|
| JP | 2019197171 | A | 11/2019 |
| JP | 2020197598 | A | 12/2020 |

* cited by examiner

FIG. 11A

IJIKLMNOPQRSTUVWXYZABCDEFGHIJIKLMNOPQRSTUVWXYZABCDEF
RSTUVWXYZABCDEFGHIJIKLMNOPQRST

MNOPQRSTUVWXYZ

VWXYZABCDEFGHIJIKLMNOPQRSTUVW

ABCDEFGHIJIKLMNOPQRSTUVWXYZABCDEFGHIJIKLMNOPQRSTUVWX

MNOPQRSTUVWXYZABCDEFGHIJIKLMN

MNOPQRSTUVWXYZABCDEFGHIJIKLMN

MNOPQRSTUVWXYZABCDEFGHIJIKLMN

MNOPQRSTUVWXYZABCDEFGHIJIKLMN

MNOPQRSTUVWXYZABCDEFGHIJIKLMN
KLMNOPQRSTUVWXY

MNOPQRSTUVWXYZABCDEFGHIJIKLMN
KLMNOPQRSTUVWXYZ

MNOPQRSTUVWXYZABCDEFGHIJIKLMN
KLMNOPQRSTUVWXYZAB

FIG. 11C

ABCDEFGH

IJIKLMNOPQRSTUVWXYZABCDEFGHIJIKLMNOPQRSTUVWXYZABCDEF
GHIJIKLMNOPQRSTUVWXYZABCDEFGHIJIKLMNOPQRSTUVWXYZ

ABCDEFGHIJIKLMNOPQRSTUVWXYZ

ABCDEFGHIJ
IKLMNOPQRSTUVWXYZABCDEFGHIJIKLMNOPQRSTUVWXYZ

ABCDEFGHIJIKLMNOPQRSTUVWXYZABCDEFGHIJIKLMNOPQRSTUVWX
YZ

ABCDEFGHIJIKLMNOPQRSTUVWXYZABCDEFGHIJIKLMNOPQRSTUVWX
YZ

ABCDEFGHIJIKLMNOPQRSTUVWXYZABCDEFGHIJIKLMNOPQRSTUVWX
YZ

ABCDEFGHIJIKLMNOPQRSTUVWXYZABCDEFGHIJIKLMNOPQRSTUVWX
YZ
ABCDEFGHIJIKLMNOPQRSTUVWXYZABCDEFGHIJIKLMNOPQRSTUVWX
YZ

ABCDEFGHIJIKLMNOPQRSTUVWXYZABCDEFGHIJIKLMNOPQRSTUVWX
YZABCDEFGHIJIKLMNOPQRSTUVWXY

VWXYZ

ABCDEFGHIJIKLMNOPQRSTUVWXYZABCDEFGHIJIKLMNOPQRSTUVWX
YZABCDEFGHIJIKLMNOPQRSTUVWXYZ

WXYZ

ABCDEFGHIJIKLMNOPQRSTUVWXYZABCDEFGHIJIKLMNOPQRSTUVWX
YZABCDEFGHIJIKLMNOPQRSTUVWXYZAB

FIG. 11D

ABCDEFGH

IJKLMNOPQRSTUVWXYZABCDEFGHIJKLMNOPQRSTUVWXYZABCDEF
GHIJKLMNOPQRSTUVWXYZABCDEFGHIJKLMNOPQRSTUVWXYZ

ABCDEFGHIJKLMNOPQRSTUVWXYZ

ABCDEFGHIJ
KLMNOPQRSTUVWXYZABCDEFGHIJKLMNOPQRSTUVWXYZ

ABCDEFGHIJKLMNOPQRSTUVWXYZABCDEFGHIJKLMNOPQRSTUVWX
YZ

ABCDEFGHIJKLMNOPQRSTUVWXYZABCDEFGHIJKLMNOPQRSTUVWX
YZ

ABCDEFGHIJKLMNOPQRSTUVWXYZABCDEFGHIJKLMNOPQRSTUVWX
YZ

ABCDEFGHIJKLMNOPQRSTUVWXYZABCDEFGHIJKLMNOPQRSTUVWX
YZ
ABCDEFGHIJKLMNOPQRSTUVWXYZABCDEFGHIJKLMNOPQRSTUVWX
YZ

ABCDEFGHIJKLMNOPQRSTUVWXYZABCDEFGHIJKLMNOPQRSTUVWX
YZABCDEFGHIJKLMNOPQRSTUVWXY

VWXYZ

ABCDEFGHIJKLMNOPQRSTUVWXYZABCDEFGHIJKLMNOPQRSTUVWX
YZABCDEFGHIJKLMNOPQRSTUVWXYZ

WXYZ

ABCDEFGHIJKLMNOPQRSTUVWXYZABCDEFGHIJKLMNOPQRSTUVWX
YZABCDEFGHIJKLMNOPQRSTUVWXYZAB

IMAGE FORMING APPARATUS AND METHOD FOR CONTROLLING SAME

BACKGROUND OF THE INVENTION

Field of the Invention

The present invention relates to an image forming apparatus and a method for controlling the same.

Description of the Related Art

Image forming apparatuses such as laser printers and digital copiers using an electrophotographic printing system have been used. When a toner image is heated and fixed onto a recording material in such an image forming apparatus, a technology to control the target temperature of a heating fixation apparatus according to a toner amount on an image calculated from image data is available. For example, Japanese Patent Application Laid-open No. 2019-197171 discloses a technology to divide image data and perform temperature control according to the characteristics of an image.

That is, in Japanese Patent Application Laid-open No. 2019-197171, image data is divided in a transporting direction and a direction orthogonal to the transporting direction to set a plurality of blocks, and parameters are set in the respective blocks on the basis of image density. Then, a temperature is controlled according to the characteristics of an image obtained from the parameters to reduce power consumption without unnecessarily increasing a target temperature.

SUMMARY OF THE INVENTION

However, in the method of Japanese Patent Application Laid-open No. 2019-197171, there is a case that a fixation temperature calculated from an image is deviated from an optimum fixation temperature. In general, when unfixed toner exists in a high-density region, a large amount of heat is taken from a fixation member during fixation. In addition, an image like a vertical stripe in which a high-density region is continuous in a recording-material transporting direction (hereinafter also called a "vertical direction") continuously takes heat from a specific portion of a fixation member. As a result, there is a likelihood that fixing performance reduces even if the print percentage of the whole image is low. Therefore, it is necessary to increase a fixation temperature.

On the other hand, text in a text image is constituted by lines. Therefore, heat is not likely to be taken from a fixation member. Further, line space exists in a general text image. In general, a line space portion has a low print percentage in a direction (hereinafter also called a "longitudinal direction") perpendicular to a recording material transporting direction depending on the array direction of text. Therefore, a text image has a characteristic that a print percentage increases and decreases at a periodical interval in a vertical direction compared with a portion in which text is printed in the longitudinal direction.

In a text image having such a characteristic, a toner portion is not continuous in a vertical direction unlike a vertical stripe, and heat is not continuously taken from a fixation member. Therefore, compared with a vertical stripe image having the same print percentage, fixing performance is securable without largely increasing a fixation temperature. Further, when a text image is not printed in boldface or when characters are not densely arranged in a vertical direction, fixing performance is securable at a lower fixation temperature. Therefore, it is possible to further reduce a fixation temperature.

Further, in a heating fixation apparatus used in an image forming apparatus, there is a likelihood that fixing performance at the end in a longitudinal direction is made lower than that at a central part due to the influence of the radiation of heat at the end. Further, a heat capacity is small when a small fixation member is used. Therefore, there is a likelihood that a calorific value applied to toner becomes short at a latter-half portion in the longitudinal direction of a recording material to cause a reduction in fixing performance. Accordingly, when an image is not densely arranged at a spot at which a fixation failure easily occurs, that is, at both ends or the latter-half portion of a recording material, fixing performance is securable even at a lower fixation temperature. Therefore, it is possible to further reduce a fixation temperature.

The present invention has been made in view of the above problem and has an object of providing an image forming apparatus in which the fixation temperature of a fixation apparatus is reduced.

The present invention provides an image forming apparatus comprising:

a fixation unit configured to heat a toner image formed corresponding to image data and fix the heated toner image onto a recording material; and a control unit configured to determine a fixation target temperature used by the fixation unit to heat the toner image on a basis of the image data, wherein the control unit performs a first determination to calculate a first target temperature on a basis of image density information in each of a plurality of regions in which the image data is divided in a main-scanning direction and a sub-scanning direction and a second determination to determine whether the image data is a text image, and determines the fixation target temperature on a basis of results of the first determination and the second determination.

The present invention also provides a method for controlling an image forming apparatus having a fixation unit configured to heat a toner image formed corresponding to image data and fix the heated toner image onto a recording material and a control unit configured to determine a fixation target temperature used by the fixation unit to heat the toner image on a basis of the image data, wherein the control unit includes:

a step of performing a first determination to calculate a first target temperature on a basis of image density information in each of a plurality of regions in which the image data is divided in a main-scanning direction and a sub-scanning direction;

a step of performing a second determination to determine whether the image data is a text image; and a step of determining the fixation target temperature on a basis of results of the first determination and the second determination.

According to the present invention, it is possible to provide an image forming apparatus in which the fixation temperature of a fixation apparatus is reduced.

Further features of the present invention will become apparent from the following description of exemplary embodiments with reference to the attached drawings.

BRIEF DESCRIPTION OF THE DRAWINGS

FIG. 11A is a diagram showing a text image for evaluation in the embodiment;

FIG. 11C is another diagram showing a text image for evaluation in the embodiment; and FIG. 11D is another diagram showing a text image for evaluation in the embodiment.

DESCRIPTION OF THE EMBODIMENTS

Hereinafter, a mode for carrying out the present invention will be exemplarily described in detail with reference to the drawings and an embodiment. However, the functions, materials, dimensions, shapes, relative arrangements, or the like of constituting elements described in the embodiment should be appropriately changed depending on the configuration, various conditions, or the like of an apparatus to which the present invention is applied, and do not intend to limit the scope of the present invention unless otherwise particularly mentioned.

Embodiment

Image Forming Apparatus

Figure 1:
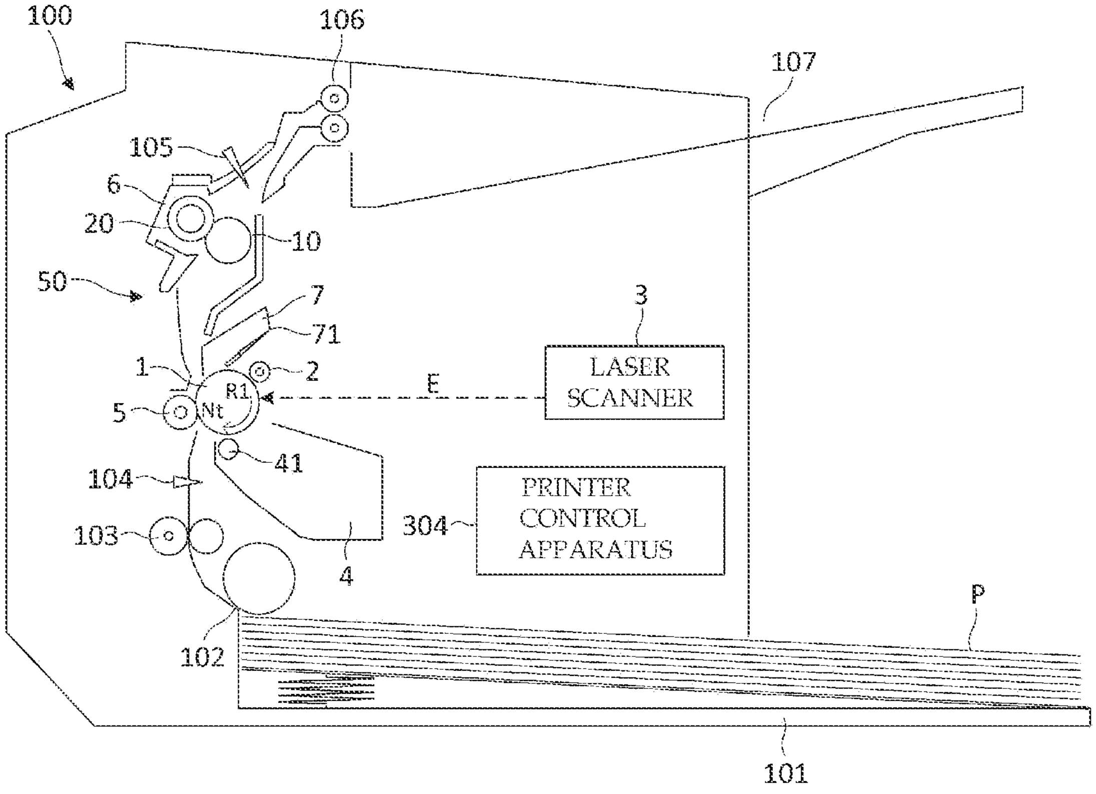
FIG. 1 is a cross-section diagram showing the configuration of an image forming apparatus in an embodiment.

FIG. 1 shows a schematic cross-section diagram of an image forming apparatus 100 of the present embodiment. Here, a laser printer will be described as an example of the image forming apparatus 100. The present invention is applicable to printers such as LED printers other than laser printers or image forming apparatuses such as digital copiers using an electrophotographic system or an electrostatic recording system.

The image forming apparatus 100 roughly includes an image forming unit 50 and a printer control apparatus 304. The image forming unit 50 includes a photosensitive drum 1, a charging roller 2, a laser scanner 3, a developing apparatus 4, a transfer roller 5, a heating fixation apparatus 6 serving as a fixation unit, and a cleaning apparatus 7. The image forming unit 50 forms a toner image corresponding to image data on a recording material P according to the control of the printer control apparatus 304 serving as a control unit. In addition, the image forming apparatus includes a sheet feeding tray 101, a sheet feeding roller 102, a transporting roller 103, a top sensor 104, a sheet discharging sensor 105, a sheet discharging roller 106, a sheet discharging tray 107, or the like.

The photosensitive drum 1 is a drum-type electrophotographic photosensitive member and constituted by providing a photosensitive material such as an OPC (Organic Photo Conductor) and amorphous silicon on a cylinder-shaped drum substrate made of an aluminum alloy, nickel, or the like. The photosensitive drum 1 is rotationally driven in an arrow R1 direction at a prescribed process speed (peripheral speed) by driving means (not shown).

The charging roller 2 evenly charges the surface of the photosensitive drum 1 so as to have a prescribed polarity and a prescribed potential. Then, an electrostatic latent image is formed on the surface of the photosensitive drum when the laser scanner 3 applies a laser beam E onto the charged photosensitive drum 1. At this time, the laser scanner 3 performs scanning exposure controlled to be turned ON/OFF according to image data in the longitudinal direction of the photosensitive drum 1 to remove the charges of an exposed portion.

The developing apparatus 4 develops the formed electrostatic latent image to be visualized. As a developing method, two-component development, contact development, or the like is used besides the jumping development of the present embodiment. Alternatively, image exposure and reversal development may be used in combination. A development roller 41 of the developing apparatus 4 attaches toner to the electrostatic latent image on the photosensitive drum 1 to form a toner image.

The toner image on the photosensitive drum 1 is transferred onto the surface of the recording material P. The recording material P is individually fed by the sheet feeding roller 102 from a state in which the recording material P is accommodated in the sheet feeding tray 101 and supplied to a transfer nip part Nt between the photosensitive drum 1 and the transfer roller 5 via the transporting roller 103 or the like.

The tip end of the recording material P is detected by the top sensor 104. The printer control apparatus 304 acquires a timing at which the tip end of the recording material P reaches the transfer nip part Nt on the basis of the position of the top sensor 104, the position of the transfer nip part Nt, and the transporting speed of the recording material P. Then, the toner image on the photosensitive drum 1 is transferred when the transfer roller 5 applies a transfer bias onto the recording material P fed and transported at a prescribed timing.

The recording material P onto which the toner image has been transferred is transported to the heating fixation apparatus 6. The heating fixation apparatus 6 performs heating and pressurization, while sandwiching and transporting the recording material P at the fixation nip part between a film unit 10 and a pressure roller 20. Thus, the toner image is fixed onto the surface of the recording material P. After that, the recording material P is discharged onto the sheet discharging tray 107 formed on the upper surface of the image forming apparatus 100 by the sheet discharging roller 106. Note that the presence or absence of the occurrence of jamming or the like is monitored when the sheet discharging sensor 105 detects a timing at which the tip end and the rear end of the recording material P pass through the sheet discharging sensor 105.

On the other hand, the cleaning apparatus 7 removes untransferred toner (residual toner that has not been transferred onto the recording material P) on the surface of the photosensitive drum 1 from which the toner image has been transferred by a cleaning blade 71. The removed untransferred toner is used for next image formation.

By repeatedly performing the above operation, the image forming apparatus 100 continuously performs image formation. The image forming apparatus 100 of the present embodiment is an apparatus that is capable of forming an image having a resolution of 600 dpi by 30 prints per minute (LTR longitudinal feed: about 200 mm/s at a process speed) and has durability of 100,000 prints.

Printer Control Apparatus

Figure 2A:
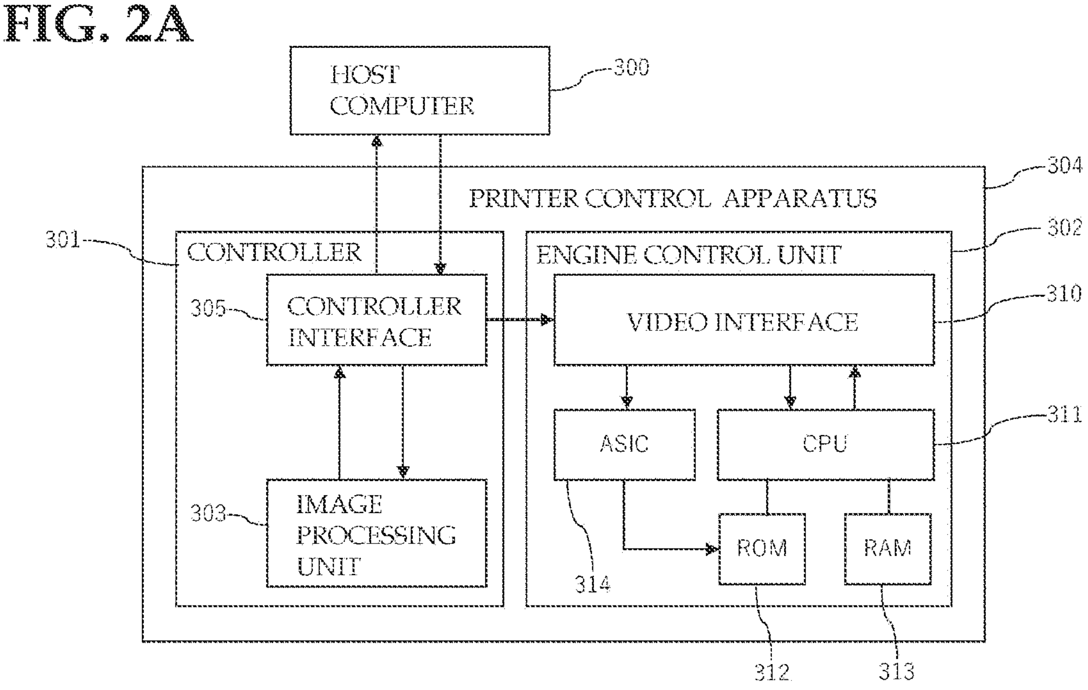
FIGS. 2A and 2B are function block diagrams relating to the control of the image forming apparatus in the embodiment.

The printer control apparatus 304 of the image forming apparatus 100 will be described using FIG. 2A. As shown in FIG. 2A, the printer control apparatus 304 and a host computer 300 constitute a printer system (image forming system).

The host computer 300 is an information processing apparatus having an instruction content from a user or image data that is the source of an image to be formed. The printer control apparatus 304 controls the image forming apparatus 100 using information received through communication with the host computer 300. The host computer 300 may be, for example, a server or a personal computer on a network such as the Internet and a LAN (Local Area Network) or may be a mobile information terminal such as a smart phone and a tablet terminal. The printer control apparatus 304 is roughly divided into a controller 301 and an engine control unit 302.

The controller 301 has an image processing unit 303 and a controller interface 305. The controller interface 305 performs communication inside and outside the printer control apparatus 304. The image processing unit 303 processes image data received from the host computer 300 via the controller interface 305. As image data processing, the image processing unit 303 performs bitmap processing of a character code, halftoning processing of a grayscale image, or the like.

Further, the controller 301 transmits image data to a video interface 310 of the engine control unit 302 via the controller interface 305. The image data of the present embodiment includes information on a target temperature for maintaining the temperature of a heater 11 calculated by the image processing unit 303. A method for calculating the target temperature will be described in detail later.

The engine control unit 302 includes a video interface 310, a CPU (Central Processing Unit) 311, a ROM (Read Only Memory) 312, a RAM (Random Access Memory) 313, and an ASIC (Application Specific Integrated Circuit; an integrated circuit for particular application) 314. The controller 301 transmits information on the lighting timing of the laser scanner 3 to the ASIC 314 and transmits a print mode and image size information to the CPU 311. The controller 301 transmits the information on the lighting timing of the laser scanner 3 to the CPU 311.

The CPU 311 performs the various control of the engine control unit 302 using the ROM 312 or the RAM 313 according to a program, a user instruction, or the like. The CPU 311 may be a single processor or may be constituted by multiple processors. The controller 301 transmits a print instruction, a cancellation instruction, or the like to the engine control unit 302 according to an instruction from a user using the host computer 300 and controls an operation such as the start and stop of a printing operation.

Figure 2B:
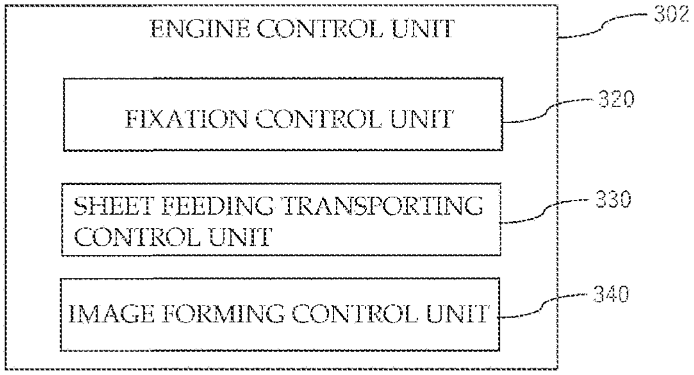

FIG. 2B shows the engine control unit 302 of the present embodiment in terms of function blocks. The engine control unit 302 has a fixation control unit 320, a sheet feeding transporting control unit 330, and an image forming control unit 340 as its function blocks. The CPU 311 performs, if necessary, processing such as storing information in the RAM 313, using a program stored in the ROM 312 or the RAM 313, and referring to information stored in the ROM 312 or the RAM 313. When the CPU 311 performs such processing, the engine control unit 302 functions as the respective units shown in FIG. 2B. The function blocks may be assumed as program modules performed by the engine control unit 302.

The fixation control unit 320 controls the temperature of the heating fixation apparatus 6. The sheet feeding transporting control unit 330 controls the operating interval of the sheet feeding roller 102. The image forming control unit 340 performs process speed control, development control, charging control, transfer control, or the like. A part or all of processing performed by the image forming apparatus 100 (for example, processing performed by the engine control unit 302 or the image processing unit 303) may be performed by the host computer 300 or a processing apparatus such as a server (not shown) on a network. Further, a part or all of the processing performed by the engine control unit 302 may be performed by the image processing unit 303, and a part or all of the processing performed by the image processing unit 303 may be performed by the engine control unit 302.

Heating Fixation Apparatus

Figure 3:
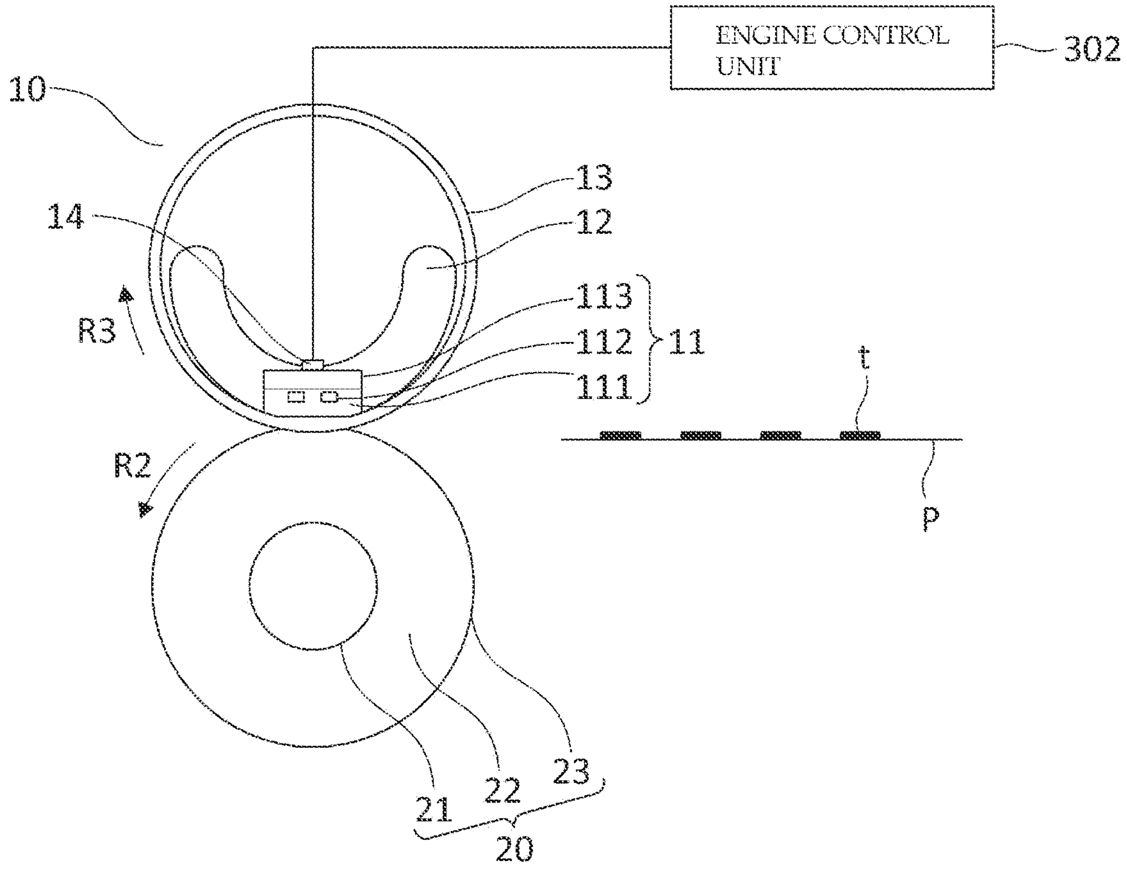
FIG. 3 is a cross-section diagram showing the configuration of a heating fixation apparatus in the embodiment.

The heating fixation apparatus 6 will be described using FIG. 3. The heating fixation apparatus 6 of the present embodiment has a film heating system and constituted by the film unit 10 and the pressure roller 20 that serves as a heating apparatus. The film unit 10 is constituted by a heat-resistant fixation film 13 that is a rotating member for heating that serves as a heat transfer member, a heater 11 that is a heating member, and a holder 12 that is a heater holding member. The heater 11 is provided inside the fixation film 13. The pressure roller 20 is provided facing the film unit 10.

When the heating fixation apparatus 6 sandwiches and transports the recording material P on which a toner image t has been formed at the fixation nip part between the fixation film 13 and the pressure roller 20, the toner image t transported together with the fixation film 13 is fixed onto the recording material P. The fixation nip part is provided extending in the main-scanning direction (the direction orthogonal to the transporting direction) of the recording material P and continuously heats the recording material P transported in a sub-scanning direction. Note that the heating fixation apparatus 6 is not limited to the configuration of the present embodiment so long as the fixation of a toner image onto a recording material is enabled.

A thermistor 14 that serves as a temperature detection member is arranged in contact with the surface of the heater 11 on the side opposite to the surface of the heater 11 on which the fixation film 13 slides. The engine control unit 302 controls a current fed to the heater 11 by the fixation control unit 320 so that the temperature of the heater 11 becomes a desired temperature on the basis of a temperature detected by the thermistor 14.

Fixation Film

The fixation film 13 is a composite layer film in which a releasable layer such as PFA, PTFE, and FEP is coated or tube-coated on the surface of a thin metallic element tube such as SUS directly or via a primer layer. Instead of the metallic element tube, a base layer obtained by molding a material in which a heat-resistant resin such as polyimide is kneaded with a heat conductive filler such as graphite into a cylindrical shape may be used. In the present embodiment, the fixation film 13 in which PFA is coated on a base layer polyimide is used. The fixation film 13 of the present embodiment has a total film thickness of 80 μm and an outer peripheral length of 56 mm. Since the fixation film 13 rotates sliding on the heater 11 and the holder 12 that are provided inside the fixation film 13, it is necessary to reduce the frictional resistance between the heater 11 and the holder 12 and the fixation film 13. In the present embodiment, a small amount of a lubricant such as heat-resistant grease is interposed on the surfaces of the heater 11 and the holder 12 to enable the smooth rotation of the fixation film 13.

Pressure Roller

The pressure roller 20 has a cored bar 21, an elastic layer 22, and a release layer 23. The elastic layer 22 is formed by foaming heat-resistant rubber such as insulating silicon rubber and fluorocarbon rubber on the cored bar 21 made of iron or the like. On the elastic layer 22, RTV silicon rubber subjected to primer processing to have adhesiveness is coated as an adhesive layer (not shown). Further, the release layer 23 is formed on the elastic layer 22 via the adhesive layer. As the release layer 23, a tube in which a conducting agent such as carbon is dispersed into PFA, PTFE, FEP, or the like is, for example, coated.

In the present embodiment, the pressure roller 20 has an outer diameter of 20 mm and a hardness of 48° (a load of 600 g under Asker-C). The pressure roller 20 is pressurized at 147 N (15 kgf) from both ends in its longitudinal direction by pressure means not shown. Thus, the fixation nip part necessary for heating and fixation is formed. Further, the pressure roller 20 is rotationally driven in an arrow R2 direction (counterclockwise direction in the drawing) of FIG. 3 by rotation driving means not shown via the cored bar 21 from the end in the longitudinal direction. Thus, the fixation film 13 is driven to rotate in an arrow R3 direction (clockwise direction in the drawing) of FIG. 3 outside the holder 12.

Heater

The heater 11 is provided inside the fixation film 13. The heater 11 has a substrate (insulating substrate) 113 made of alumina or aluminum nitride that is a ceramic material and a resistance heating layer (heating body) 112 formed on the substrate 113. The resistance heating layer 112 is coated with a thin overcoat glass 111 to improve insulation and abrasion resistance, and the overcoat glass 111 contacts the inner peripheral surface of the fixation film 13. The overcoat glass 111 has excellent voltage resistance and abrasion resistance and is configured and arranged to slide on the fixation film 13.

In the embodiment, the overcoat glass 111 has a heat conductivity of 1.0 W/mK, a voltage resistance characteristic of at least 2.5 kV, and a film thickness of 70 μm. Further, in the embodiment, the material of the substrate 113 is aluminum, and the substrate 113 has a width of 6.0 mm, a length of 260.0 mm, and a thickness of 1.00 mm as its dimensions. Further, the substrate 113 has a thermal expansion coefficient of $7.6\times10^{-6}$/° C. In the embodiment, the resistance heating layer 112 is made of a silver-palladium alloy. The resistance heating layer 112 has a total resistance value of 20Ω and resistivity temperature dependence of 700 ppm/° C.

Holder

The holder 12 is a heat insulating stay holder that is a member for holding the heater 11 and prevents the radiation of heat to the back side of the fixation nip part. The holder 12 is made of liquid crystal polymer, a phenol resin, PPS, PEEK, or the like. The fixation film 13 is externally fitted to the holder 12 with a certain degree of room and rotatably arranged. In the embodiment, the material of the holder 12 is liquid crystal polymer, and the holder 12 has a heat resistance of 260° C. and a thermal expansion coefficient of $6.4\times10^{-5}$/° C.

Engine Control Unit

The engine control unit 302 controls the temperature of the heater 11 to a prescribed target temperature on the basis of a temperature detected by the thermistor 14 according to a control program. Therefore, the engine control unit 302 controls power supplied to the heater 11 so that the heater 11 maintains the target temperature. The engine control unit 302 is an example of a control unit. As a control method, PID control based on a proportional term, an integral term, and a differential term is preferably used. The following Formula (1) shows a formula for performing the control.

$$f(t)=\alpha1\times e(t)+\alpha2\times\Sigma e(t)+\alpha3\times(e(t)-e(t-1)) \quad (1)$$

Here, respective terms are as follows.

t: control timing f(t): ratio of a heater energization time within a control cycle at a control timing (t) (full lighting when a value is 1 or more)

e(t): temperature difference between a target temperature and an actual temperature at a current control timing (t)

e(t−1): temperature difference between a target temperature and an actual temperature at a previous control timing (t−1)

α1 to α3: gain constant

α1: P (proportional) term gain

α2: I (integral) term gain

α3: D (differential) term gain

The first to third terms on the right side of Formula (1) correspond to proportional control, integral control, and differential control, respectively. α1 to α3 are proportional coefficients for weighting the increasing and decreasing amount of the energization time ratio of the heater 11 within the control cycle. The proportional coefficients α1 to α3 are set according to the characteristics of the heating fixation apparatus 6 to enable appropriate temperature control. The engine control unit 302 determines the energization time of the heater 11 within the control cycle according to the value of f(t) and causes a heater energization time control circuit not shown to drive to determine power output to the heater 11. Note that the power output to the heater 11 may be controlled on the basis of PI control in which the D-term gain is set at 0 to activate only a P-term and an I-term if a D-term is not necessary. In the embodiment, the control timing is updated at intervals of a 100 msec control cycle, the P-term gain (α1) is set at 0.05° C.−1, the I-term gain (α2) is set at 0.01° C.−1, and the D-term gain (α3) is set at 0.001° C.−1. In the present embodiment, the energization time within the control cycle becomes maximum when the value of f(t) is 1. When a calculation result is larger than 1, the maximum energization time within the control cycle is adjusted to perform energization.

Figure 4:
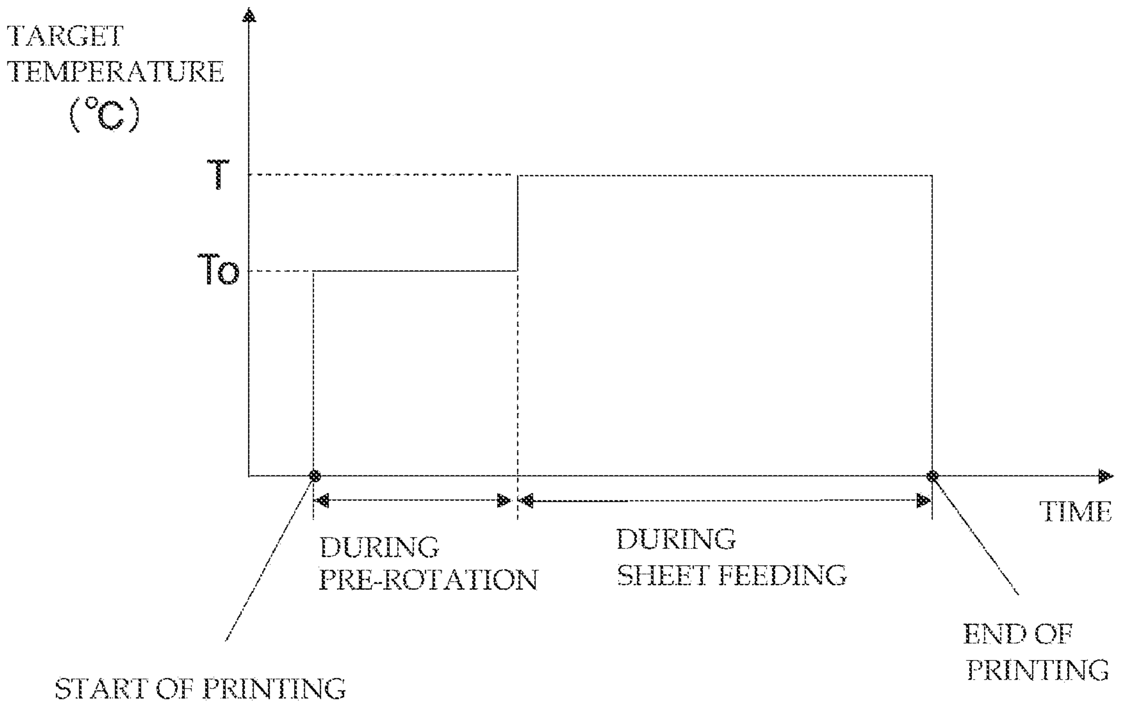
FIG. 4 is a diagram for describing the control sequence of a target temperature in the embodiment.

Here, FIG. 4 shows the control sequence of the target temperature of the heater 11 by the engine control unit 302. During pre-rotation (a period until the tip end of the recording material P enters the fixation nip part after a printing operation has started), the engine control unit 302 controls power supplied to the heater 11 so that a target temperature To is maintained. Here, it is assumed that the target temperature To is 170° C.

Subsequently, during sheet feeding (a period until the rear end of the recording material P passes through the fixation nip part after the tip end of the recording material P has entered the fixation nip part), the engine control unit 302 controls the power supplied to the heater 11 so that a target temperature T is maintained. The target temperature T during the sheet feeding is in the range of at least 170° C. and not more than 204° C. and determined by a calculation method that will be described later.

Further, during the period between sheets (a period until the following recording material P enters the fixation nip part after the rear end of the previous recording material P has passed through the fixation nip part), the engine control unit 302 controls the power supplied to the heater 11 so that a target temperature (for example, 180° C.) is maintained.

Image Processing Unit

Calculation of Target Temperature from Image Data

The image processing unit 303 has a processor such as a CPU and memories such as a ROM and a RAM. Note that an information processing apparatus that functions as the engine control unit 302 may function as the image processing unit 303. The image processing unit 303 also performs processing to calculate a target temperature from image data, besides halftoning processing of a grayscale image. The following example will describe the processing of the image processing unit 303 in a case in which a toner image corresponding to image data is formed on the surface of one sheet of recording material P.

First Determination Method (Determination of Temporary Target Temperature Based on Image Density Information on Divided Regions)

In a first determination method, the image processing unit 303 divides image data into areas and regions and then classifies the respective regions into seven representative values. Next, the image processing unit 303 converts the classified representative values into the addition amounts of temperatures in the respective regions and then adds the addition amounts of the temperatures together in a sub-scanning direction. Further, the image processing unit 303 selects a maximum value from among the added values in a plurality of main-scanning areas and adds the selected value to a basic controlled temperature to calculate a temporary target temperature T1 (first target temperature). Hereinafter, each step will be sequentially described.

Division of Image Data

Figure 5:
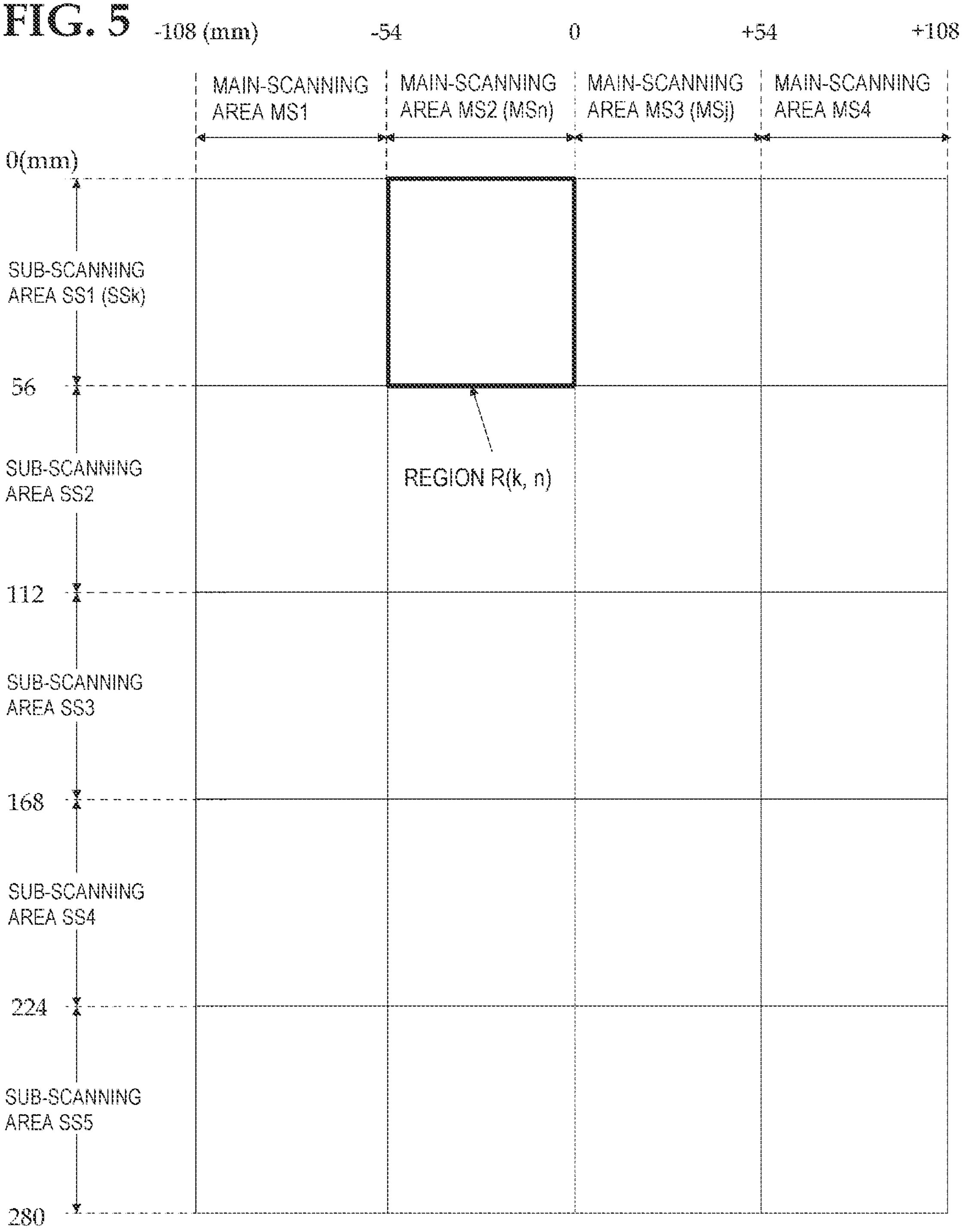
FIG. 5 is a diagram for describing the division of image data in a first determination of the embodiment.

The division of image data by the image processing unit 303 will be described with reference to FIG. 5. In the following description, a "sub-scanning direction" is the transporting direction of the recording material P, and a "main-scanning direction" is a direction orthogonal to the sub-scanning direction. Further, as shown in FIG. 5, "sub-scanning areas" are respective areas in which the image data is divided so as to be continuous in the sub-scanning direction, and "main-scanning areas" are respective areas in which the image data is divided so as to be continuous in the main-scanning direction.

Main-Scanning Area Dividing Step

The image processing unit 303 divides the whole area of the image data in the main-scanning direction to provide the main-scanning areas. In the present embodiment, the number of divisions is four. Here, the center of a sheet is set as an origin on the heating fixation apparatus when the LTR-size sheet (having a short side of 216 mm) is fed to the heating fixation apparatus, and the coordinate of the origin is set as 0 mm. Further, a left side and a right side relative to the transporting direction are defined as a negative side and a positive side, respectively. In the present embodiment, the respective main-scanning areas are set as shown in Table 1 and FIG. 5. That is, a main-scanning area $MS_1$ falls within the range of −108 mm to −54 mm, a main-scanning area $MS_2$ falls within the range of −54 mm to 0 mm, a main-scanning area $MS_3$ falls within the range of 0 mm to +54 mm, and a main-scanning area $MS_4$ falls within the range of +54 mm to +108 mm.

TABLE 1

| Main-scanning Area MS | Area range |
|---|---|
| 1 | −108 mm~−54 mm |
| 2 | −54 mm~0 mm |
| 3 | 0 mm~+54 mm |
| 4 | +54 mm~+108 mm |

Sub-Scanning Area Dividing Step

The image processing unit 303 divides the whole area of the image data in the sub-scanning direction to provide the sub-scanning areas. In the present embodiment, the number of divisions is five. A position at which an image starts is set as an origin on the heating fixation apparatus, and the coordinate of the origin is set as 0 mm. In the present embodiment, the respective sub-scanning areas are set as shown in Table 2 and FIG. 5. That is, a sub-scanning area $SS_1$ falls within the range of 0 mm to 56 mm, a sub-scanning area $SS_2$ falls within the range of 56 mm to 112 mm, a sub-scanning area $SS_3$ falls within the range of 112 mm to 168 mm, a sub-scanning area $SS_4$ falls within the range of 168 mm to 224 mm, and a sub-scanning area $SS_5$ falls within the range of 224 mm to 280 mm. Note that the range of each of the sub-scanning areas is set at 56 mm so that the length of the sub-scanning areas in the sub-scanning direction is made substantially coincident with the peripheral length of the fixation film 13 in the present embodiment. A reason for this length will be described later in the section of the determination of a target temperature T. Here, the length of the sub-scanning areas may not be completely the same as the peripheral length of the fixation film 13, but they are preferably coincident with each other to such an extent that a reduction in temperature is effectively prevented.

TABLE 2

| Sub-scanning area SS | Area range |
|---|---|
| 1 | 0 mm~56 mm |
| 2 | 56 mm~112 mm |
| 3 | 112 mm~168 mm |
| 4 | 168 mm~224 mm |
| 5 | 224 mm~280 mm |

Region Setting Step

The image processing unit 303 sets one range partitioned by a main-scanning area and a sub-scanning area as a region. Hereinafter, ranges partitioned by main-scanning areas $MS_n$ and sub-scanning areas $SS_k$ will be called "regions $R_{(k,n)}$".

Placement of Regions into Ranks

The image processing unit 303 calculates printing amounts inside the regions $R_{(k,n)}$.

Counting of High-Density Pixels

First, the image processing unit 303 acquires the number of pixels having a density of at least a prescribed value. Here, the image processing unit 303 extracts high-density pixels having a gray density of at least 4% from the respective regions. Then, the image processing unit 303 counts up the total number of the high-density pixels in the regions $R_{(k,n)}$ and assumes the counted number as $N_{(k,n)}$.

Then, the image processing unit 303 places the total number $N_{(k,n)}$ of the high-density pixels inside the regions $R_{(k,n)}$ into the seven levels of ranks 0 to 6 according to Table 3.

TABLE 3

| Rank | Total number $N_{(k, n)}$ of high-density pixels |
|---|---|
| 0 | 0~1316 |
| 1 | 1317~31080 |
| 2 | 31081~62160 |
| 3 | 62161~124320 |
| 4 | 124321~248640 |
| 5 | 248641~497280 |
| 6 | 497281~ |

The ranks of printing amounts inside the regions $R_{(k,n)}$ calculated as described above are assumed as $Rank_{(k,n)}$. By the above processing procedure, it is possible to consolidate information on the printing amounts of the whole area of the image data into the rank information of the seven levels for the respective 20 regions.

Conversion into Temporary Target Temperature T1

Subsequently, the image processing unit 303 determines the temporary target temperature T1 on the basis of the ranks of the printing amounts of the respective regions. Hereinafter, the temporary target temperature T1 will be described together with the assumed shape of a printed character and an associated phenomenon.

Assumed Image and Influence of Reduction in Temperature

First, prior to the description of a specific processing content, image data that is printed in a vertical stripe shape will be studied as an assumed image greatly susceptible to a reduction in temperature with respect to the respective ranks. That is, when the ranks of the printing amounts of the respective regions are determined, the image processing unit 303 assumes the printing of rectangles (hereinafter called vertical-stripe-shaped printed characters) fully expanding in the sub-scanning direction inside the regions with the widths of the number of pixels based on the ranks. Then, the image processing unit 303 assumes a target temperature at which the substantial fixation of the printing of the vertical-stripe-shaped printed characters is enabled.

For example, when the length in the sub-scanning direction of a region is 56.5 mm, the width of a vertical-stripe-shaped printed character in the main-scanning direction is assumed as follows. That is, it is assumed that the width of the printed character is 0.042 mm at the rank 0, 1 mm at the rank 1, 2 mm at the rank 2, 4 mm at the rank 3, 8 mm at the rank 4, 16 mm at the rank 5, and the entire width in the main-scanning direction of the region at the rank 6. The width of the printed character is assumed as described above since the vertical-stripe-shaped printed character requires the highest target temperature T at the rank of a certain printing amount. That is, when toner is arranged in a vertical stripe shape, heat is continuously taken from a specific position in the main-scanning direction of a member (such as the fixation film 13 and the heater 11) that is responsible for heating in the heating fixation apparatus 6. Then, the temperature of the portion is reduced, which results in a reduction in fixing performance. Accordingly, it is necessary to increase the target temperature T to compensate for the reduced heat.

The phenomenon of the reduction in the temperature is almost ignorable since it is compensated by heat flowing in from a surrounding member if the thickness in the main-scanning direction of the vertical stripe is small. However, the heat hardly flows in the central part of the vertical stripe as the thickness of the vertical stripe increases. Therefore, the phenomenon of the reduction in the temperature is not ignorable since the degree of the reduction in the temperature increases, and the higher target temperature T becomes necessary.

Figure 6:
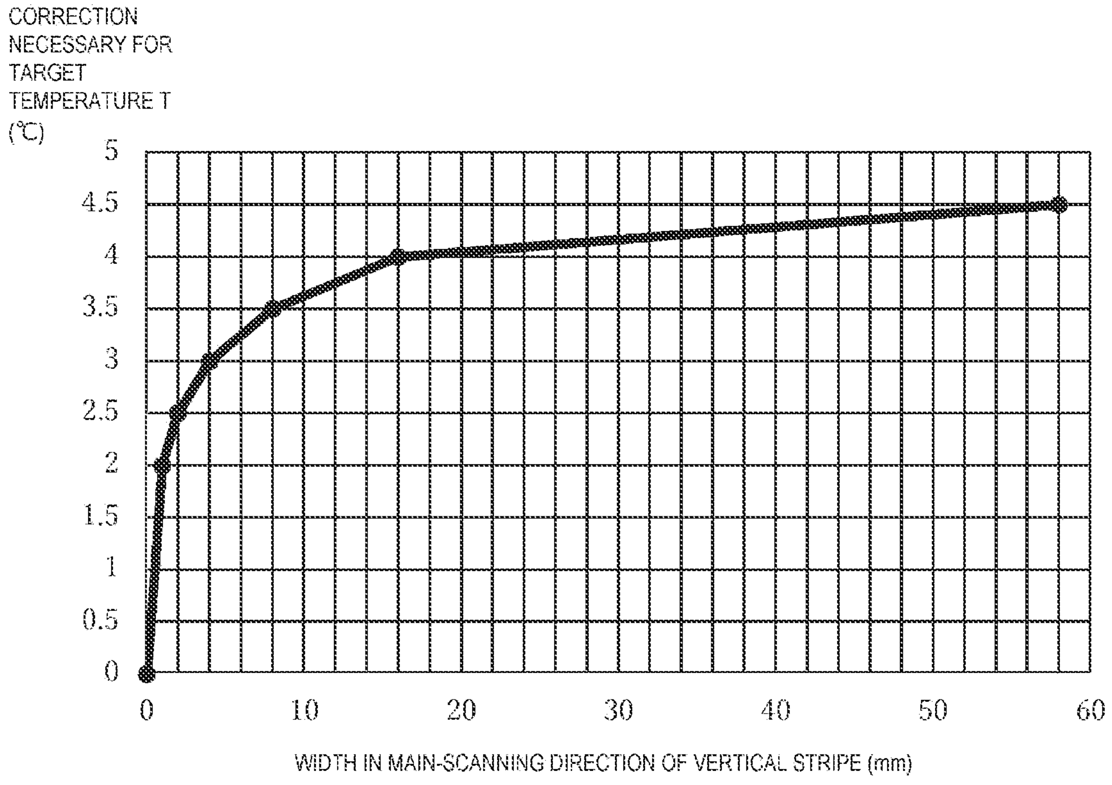
FIG. 6 is a diagram showing the relationship between the width of a vertical-stripe-shaped printed character and the correction amount of a target temperature in the first determination of the embodiment.

FIG. 6 shows the relationship between the width in the main-scanning direction of the vertical stripe and the correction amount of the target temperature T. Here, the target temperature T necessary for fixing a vertical line having a width of 0.042 mm and a length of 56.5 mm in the transporting direction is set as a reference. At this time, the target temperature T necessary for fixing a vertical line having a width of 1 mm is higher by 2° C. Further, the target temperature T necessary for fixing a vertical line having a width of 16 mm is higher by 4° C. Note that the increase ratio of the target temperature T becomes gentler as the width in the main scanning direction increases. When the width exceeds 58 mm, the influence of the inflow of heat from the outside of the vertical stripe is almost eliminated. Therefore, further temperature correction becomes unnecessary.

Note that in the configuration of the present embodiment, the basic value of a target temperature is set and a correction amount (addition amount) to the basic value is calculated on the basis of image data. However, other methods may be employed so long as it is possible to finally calculate a target temperature on the basis of image data. For example, a method for directly calculating a target temperature on the basis of image data without setting a basic value or a correction amount may be employed.

Figure 7:
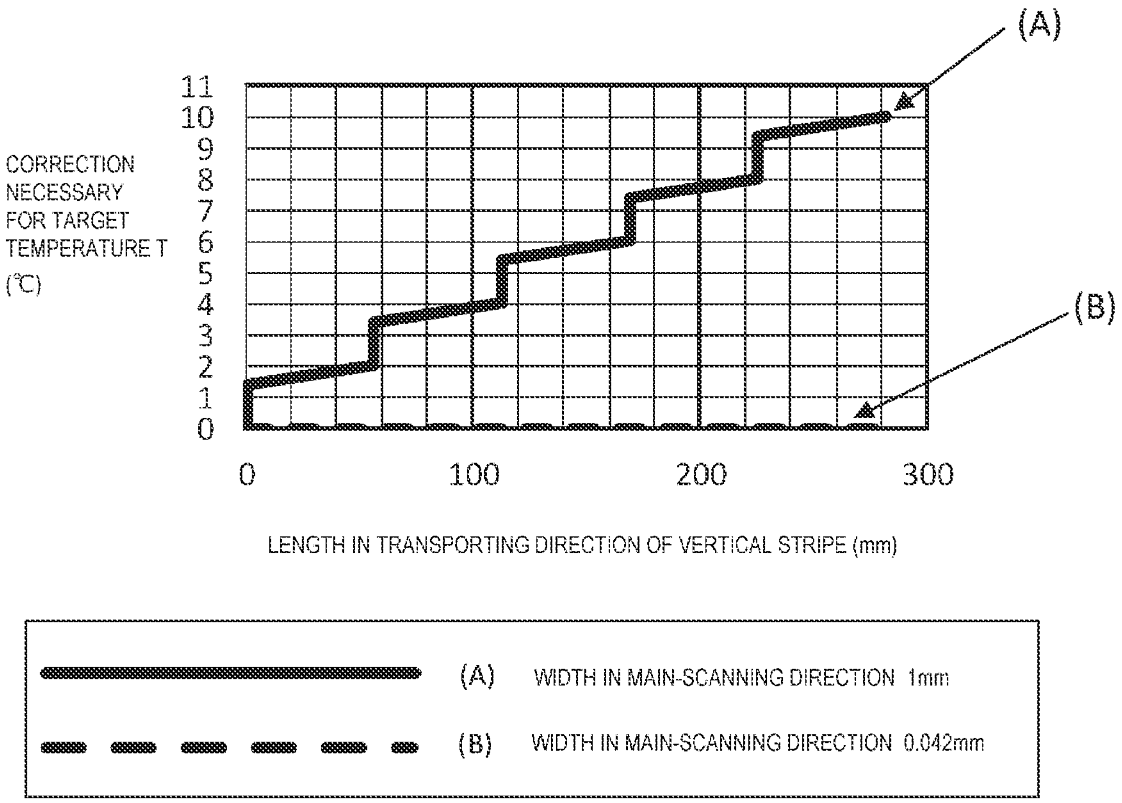
FIG. 7 is a diagram showing the relationship between the length of the vertical-stripe-shaped printed character and the correction amount of the target temperature in the first determination of the embodiment.

Note that the phenomenon of the reduction in the temperature becomes larger as the length in the sub-scanning direction of the vertical stripe increases and is particularly remarkable when the length in the sub-scanning direction of the vertical stripe exceeds a constant multiple of the peripheral length of the fixation film 13. FIG. 7 is a graph showing the relationship between the length of the vertical stripe in the transporting direction (sub-scanning direction) and the correction amount of the target temperature T necessary for compensating for the reduction in the temperature.

In the case of a vertical stripe having a width of 0.042 mm in the main-scanning direction, the necessary correction amount of the target temperature T remains the same even if the length in the sub-scanning direction of the vertical stripe is 56.5 mm or 287 mm corresponding to an image length inside an A4-size sheet. This is because the inflow of heat from a surrounding member is sufficient when the vertical stripe has a width of about 0.042 mm and therefore a reduction in the temperature of a local member is ignorable.

On the other hand, in the case of a vertical stripe having a width of 1 mm in the main-scanning direction, the degree of a reduction in the temperature of the member increases. Therefore, the necessary correction amount of the target temperature T increases in proportion to the length in the transporting direction of the vertical stripe. At this time, as shown in FIG. 7, the necessary correction amount of the target temperature T remarkably increases when the length in the transporting direction of the vertical stripe exceeds the length of a constant multiple of the peripheral length of the fixation film 13. This is because the rotating fixation film 13 performs fixation in contact with toner in a state in which heat is taken by a vertical stripe in a previous cycle.

Therefore, when the length in the sub-scanning direction obtained by dividing the areas in the sub-scanning direction is made substantially coincident with the peripheral length of the fixation film 13 as described above, it is possible to perform arithmetical operation reflecting the phenomenon. Therefore, a higher power consumption reduction effect is obtained. Here, when the length in the sub-scanning direction is made substantially coincident with the peripheral length of the fixation film 13, both lengths may only be coincident with each other to such an extent that the influence of the reduction in the temperature is ignorable even if they are not the same in a strict sense.

Calculation of Temporary Target Temperature T1

On the basis of the above precondition, a specific method for calculating the temporary target temperature T1 will be described. The temporary target temperature T1 is calculated in such a manner that correction amounts necessary when the printing amounts of regions are non-zero are calculated as addition amounts ΔT using a temperature obtained when the ranks of the printing amounts of the regions are 0 as a base.

First, in the present embodiment, a temperature necessary for fixing a vertical stripe having a width of 0.042 mm that corresponds to the rank 0 is 170° C. Further, addition amounts necessary when the ranks of the printing amounts of respective regions are other than the rank 0 are defined according to FIG. 6 and shown in Table 4. Thus, the ranks of the printing amounts of the regions $R_{(k,n)}$ are converted into the addition amounts $\Delta T_{(k,n)}$.

TABLE 4

| Rank of printing amount | Width of corresponding vertical stripe (mm) | Necessary addition amount ΔT (° C.) |
|---|---|---|
| 0 | 0.042 | 0 |
| 1 | 1 | 2.5 |
| 2 | 2 | 3 |
| 3 | 4 | 3.5 |
| 4 | 8 | 4 |
| 5 | 16 | 4.5 |
| 6 | 58 | 4.5 |

Next, the addition amounts $\Delta T_{(k,n)}$ are added together for five regions (region columns) continuous in the sub-scanning direction to calculate $\Delta T_{MSn}$ as a candidate value of the correction amount of a target temperature. That is, an amount obtained by adding addition amounts $\Delta T_{(1,n)}$, $\Delta T_{(2,n)}$, $\Delta T_{(3,n)}$, $\Delta T_{(4,n)}$, $\Delta T_{(5,n)}$ together is calculated as a candidate value $\Delta T_{MSn}$ for each of the four main-scanning areas $MS_1$ to $MS_n$. The above calculation is made since the necessary target temperature T increases proportionately when a vertical stripe corresponding to the rank of a printing amount is arranged in each of the five regions continuous in the sub-scanning direction. That is, the addition amounts $\Delta T_{(k,n)}$ are values converted from image density inside the regions to calculate the candidate values $\Delta T_{MSn}$ in the main-scanning areas $MS_n$ including the regions $R_{(k,n)}$.

Accordingly, a value obtained by adding a maximum one of the four calculated candidate values $\Delta T_{MS1}$, $\Delta T_{MS2}$, $\Delta T_{MS3}$, and $\Delta T_{MS4}$ to a basic temperature (here, 170° C.) is the temporary target temperature T1. According to the procedure described above, the candidate values $\Delta T_{MS1}$, $\Delta T_{MS2}$, $\Delta T_{MS3}$, and $\Delta T_{MS4}$ and the temporary target temperature T1 are determined in the first determination.

Second Determination Method (Detection of Text Image)

Figure 8:
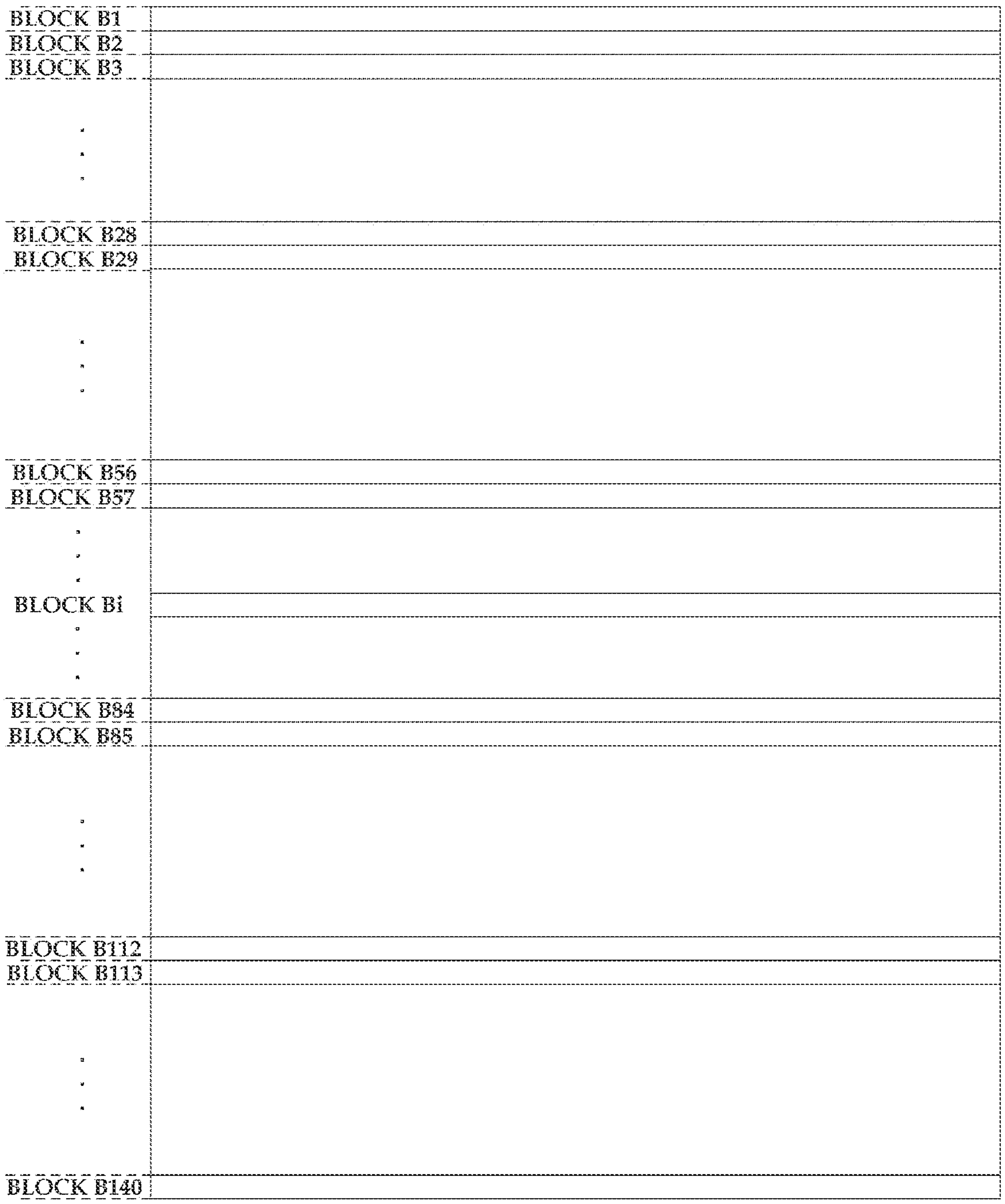
FIG. 8 is a diagram for describing the division of image data in a second determination of the embodiment.

In a second determination method, a determination is made as to whether an image is a text image. The image processing unit 303 divides the whole area of image data into strip-shaped blocks that are short in the sub-scanning direction and long in the main-scanning direction. In the present embodiment, the length in the sub-scanning direction of the blocks is 2 mm, and the length in the main-scanning direction of the blocks is the whole width of the image data. As shown in FIG. 8, numbers are sequentially assigned to the blocks with the lead block in the transporting direction assumed as a block $B_1$, and the i-th block from the lead is defined as a block $B_i$. In the example, the image data is divided into the blocks $B_1$ to $B_{140}$. Note that the present embodiment exemplifies a method suitable when text and line space in a text image are arranged in the main-scanning direction orthogonal to the transporting direction of the recording material P. However, the present invention is not limited to the method.

The present embodiment will describe a method for determining the type of an image, that is, a text image by calculating the differences of the numerical values X between the blocks with respect to the numerical values X obtained by adding print percentages of the respective blocks together. The image processing unit 303 calculates a print percentage for a block having a length of 2 mm in the sub-scanning direction and expanding in the whole area in the main-scanning direction, that is, for each of the blocks. The image processing unit 303 repeatedly performs an arithmetical operation of the differences of the print percentages between two blocks adjacent in the sub-scanning direction and assumes the total of the calculated differences of the print percentages as a difference value S. Further, the image processing unit 303 assumes the print percentage of the whole area of the image as a print percentage D. The image processing unit 303 assumes a value obtained by dividing the difference value S by the print percentage D as a print percentage difference G and discriminates the type of the image depending on whether the print percentage difference G is larger than a threshold Y.

Figure 9:
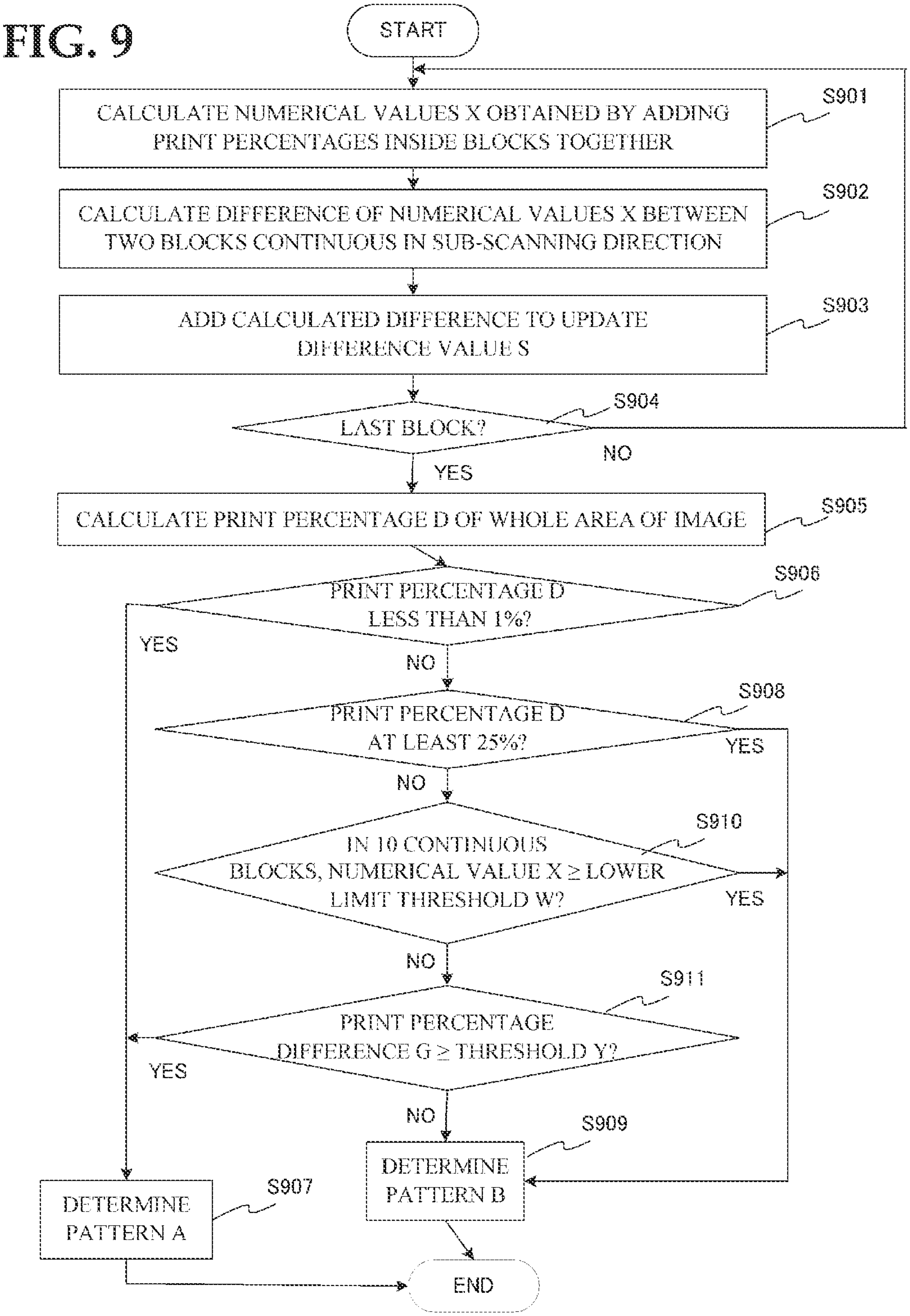
FIG. 9 is a flowchart for determining the type of an image in a second determination method of the embodiment.

FIG. 9 is a flowchart showing the procedure of the second determination method. In step S901, the image processing unit 303 serving as conversion means adds print percentages inside two blocks continuous in the sub-scanning direction together to calculate numerical values X with respect to the blocks. In step S902, the image processing unit 303 serving as analysis means calculates the difference of the numerical values X between the two blocks continuous in the sub-scanning direction. In step S903, the image processing unit 303 adds the difference calculated in step S902 to a difference value S and updates the value of the difference value S. In step S904, the image processing unit 303 determines whether a block of which the print percentages are calculated is the last block (here, the 140th block). When the block is not the last block, the image processing unit 303 returns to step S901 to repeat the processing. Otherwise, the image processing unit 303 proceeds to step S905.

In step S905, the image processing unit 303 calculates a print percentage D of the whole area of an image. In S906, the image processing unit 303 determines whether the print percentage D of the whole area of the image is less than 1%. When the print percentage D is less than 1% (YES in S906), the image processing unit 303 determines that the image is a pattern A (text image) in step S907. On the other hand, when the print percentage D is at least 1% (NO in S906), the image processing unit 303 determines whether the print percentage D of the whole area of the image is at least 25% in step S908. When the print percentage D is at least 25% (YES in S908), the image processing unit 303 determines that the image is a pattern B (an image other than text) in step S909. That is, the image processing unit 303 is enabled to discriminate the type of the image by analyzing respective numerical values based on the numerical values X calculated by converting the image data.

In addition, when the print percentage D is at least 1% and less than 25% (NO in step S908), the image processing unit 303 determines the image by comparing the values of the numerical values X of the plurality of blocks with each other. Specifically, in step S910, the image processing unit 303 determines whether any block having a numerical value X smaller than a lower limit threshold W exists among 10 continuous blocks. When any block having a numerical value X smaller than the lower limit threshold W does not exist among the 10 continuous blocks in step S910, the image processing unit 303 may determine that the image having a high print percentage is continuously formed in the sub-scanning direction. Therefore, the image processing unit 303 determines that the image is the pattern B in step S909.

The lower limit threshold W is a threshold for detecting the presence or absence of an image interval in the sub-scanning direction in an image formed on one sheet of recording material P. In other words, it can be said that the lower limit threshold W is a value for recognizing line space in a text image. When a numerical value X that is the addition value of print percentages in one block is below the lower limit threshold W, the image processing unit 303 is enabled to determine that an image is hardly formed in the block. That is, the image processing unit 303 is enabled to recognize the presence of line space in a text image.

Note that when the value of the lower limit threshold W is set at 0, the image processing unit 303 is not enabled to recognize line space even if a one-dot image (thin vertical stripe) is formed inside one block and the determination of the presence of the line space is desired. Conversely, when the value of the lower limit threshold W is set to be large, the image processing unit 303 recognizes line space even if a certain degree of a thick image (thick vertical stripe) is, for example, formed in one block and the determination of line space is not desired.

Therefore, the value of the lower limit threshold W is set at 0.04 (4%) in the present embodiment. When a numerical value X smaller than the lower limit threshold W does not exist in the 10 continuous blocks, the image processing unit 303 is enabled to determine that a vertical stripe image having a length of at least about 20 mm is formed. In view of the heating fixation apparatus 6 of the present embodiment, there is a possibility that securement of fixing performance becomes difficult when an image having at least a prescribed print percentage continues by at least 20 mm. Therefore, the image processing unit 303 determines that the image is the pattern B. Further, the 10 blocks are exemplified here as a determination reference. However, it is possible to appropriately set the number of blocks depending on the fixing performance or the like of the heating fixation apparatus 6.

When the print percentage D is at least 1% and less than 25% and any block having the numerical value X smaller than the lower limit threshold W exists among the 10 continuous blocks (NO in S910), the image processing unit 303 proceeds to step S911 to calculate a print percentage difference G. The print percentage difference G is calculated by dividing the difference value S by the print percentage D. When the print percentage difference G is at least a threshold in step S911, the image processing unit 303 determines that the image is the pattern A in step S907. On the other hand, when the print percentage difference G is smaller than the threshold Y, the image processing unit 303 determines that the image is the pattern B in step S909.

Note that a difference in the print percentage between blocks becomes larger as the value of the print percentage difference G increases. That is, when a text image is taken into consideration, a situation in which line space exists in the text image is determined. On the other hand, a difference in the print percentage between blocks becomes smaller as the value of the print percentage difference G reduces. That is, it is highly likely that an image like a bulk having a partially high print percentage is formed or an image like a vertical stripe continuous in the sub-scanning direction is formed. Accordingly, the threshold Y that enables a determination as to whether an image is a text image is desirably set. In the present embodiment, the threshold Y is set at 35 in view of the characteristics of general text images.

According to the flowchart described above, the type of an image is classified into the pattern A (text image) or the pattern B (image other than text) in the second determination.

Method for Determining Fixation Target Temperature T

A method for determining the fixation target temperature T will be described using the candidate values $\Delta T_{MS1}$, $\Delta T_{MS2}$, $\Delta T_{MS3}$, and $\Delta T_{MS4}$ and the temporary target temperature T1 calculated by the first determination method and the pattern A or the pattern B classified by the second determination method.

Figure 10:
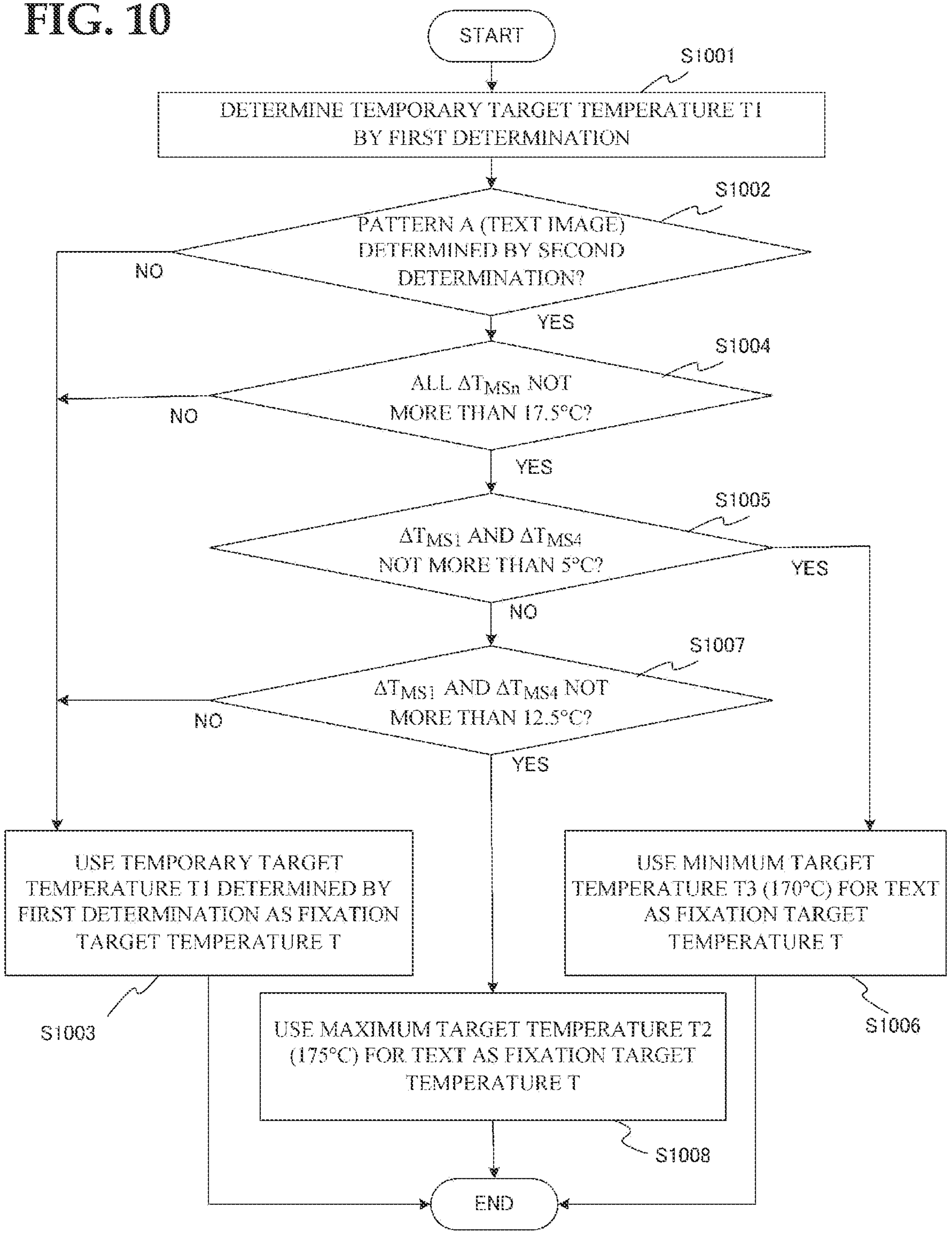
FIG. 10 is a flowchart showing a method for determining a fixation target temperature in the embodiment.

FIG. 10 is a flowchart showing a procedure for determining a fixation target temperature according to the present embodiment. In step S1001, the first determination method is performed to determine a temporary target temperature T1. Next, in step S1002, the second determination method is performed to classify an image into a pattern A or a pattern B. Here, when it is determined that the image is the pattern B (an image other than a text image) (NO in S1002), the temporary target temperature T1 determined by the first determination is used as a fixation target temperature T in step S1003 to end the processing.

On the other hand, when it is determined that the image is the pattern A (text image) (YES in S1002), a determination is made for candidate values $\Delta T_{MS1}$, $\Delta T_{MS2}$, $\Delta T_{MS3}$, and $\Delta T_{MS4}$ calculated by the first determination method in step S1004 and the subsequent steps. In step S1004, a determination is made as to whether all the candidate values $\Delta T_{MSn}$ are not more than 17.5° C. When all the candidate values $\Delta T_{MSn}$ are not more than 17.5° C. (YES in S1004), the processing proceeds to step S1005. On the other hand, when even any one of the candidate values $\Delta T_{MSn}$ exceeds 17.5° C. (NO in S1004), characters are continuous in a vertical direction even in a text image. Therefore, the temporary target temperature T1 determined by the first determination is used as the fixation target temperature T in step S1003, and then the processing ends. As described above, in step S1004, the continuity of text in the text image is determined in respective main-scanning areas. When the continuity exceeds a prescribed continuity reference in all the main-scanning areas, the temporary target temperature T1 is used as the fixation target temperature T. In the present embodiment, a candidate value to be added to a basic temperature is used as the continuity reference. However, the continuity reference is not limited to the candidate value. For example, a value obtained by adding a candidate value to the basic temperature or a value calculated on the basis of image density may be used.

In step S1005, a determination is made as to whether the candidate values $\Delta T_{MS1}$ and $\Delta T_{MS4}$ at both ends are not more than 5° C. When the candidate values at both ends are not more than 5° C. (YES in S1005), printing amounts are small at both ends having low fixing performance. Therefore, the processing proceeds to step S1006, and T3 (here, 170° C.) that is a minimum target temperature for a text image is used as the fixation target temperature T. After that the processing ends. In this case, T3 becomes a second target temperature. As described above, in step S1005, the continuity of text in the text image is determined in the main-scanning areas of the ends. Then, when it is determined that the continuity is not more than a prescribed end continuity reference in all the main-scanning areas, a value lower than the temporary target temperature T1 is used as the fixation target temperature T. In the present embodiment, a candidate value to be added to a basic temperature is used as the end continuity reference. However, the text continuity reference is not limited to the candidate value. For example, a value obtained by adding a candidate value to the basic temperature or a value calculated on the basis of image density may be used.

On the other hand, when even any one of the candidate values $\Delta T_{MS1}$ and $\Delta T_{MS4}$ exceeds 5° C. (NO in S1005), the processing proceeds to step S1007. Then, a determination is made as to whether the candidate values $\Delta T_{MS1}$ and $\Delta T_{MS4}$ are not more than 12.5° C. When the candidate values $\Delta T_{MS1}$ and $\Delta T_{MS4}$ are not more than 12.5° C. (YES in S1007), the processing proceeds to step S1008. In step S1008, T2 (here, 175° C.) that is a maximum target temperature for the text image is used as the fixation target temperature T. In this case, T2 becomes the second target temperature. On the other hand, when even any one of the candidate values $\Delta T_{MS1}$ and $\Delta T_{MS4}$ exceeds 12.5° C. (NO in S1007), a printing amount is large at the end even in the text image. Therefore, the temporary target temperature T1 determined by the first determination is used as the fixation target temperature T in step S1003, and then the processing ends.

As described above, printing information for each area in the first determination and information as to whether an image is a text document in the second determination are combined together to make a determination in the present embodiment. Thus, a printing amount in the vertical direction of the text document is detected and set in an optimum fixation target temperature T. Note that text target temperatures T2 and T3 determined by the combination of the first determination and the second determination together do not exceed a temporary target temperature T1 determined in the first determination. Therefore, it is possible to reduce a controlled temperature compared with a case in which only the first determination is used.

EVALUATION EXAMPLES

Figure 11B:
FIG. 11B is another diagram showing a text image for evaluation in the embodiment.

Evaluation examples for confirming whether a desired power consumption reduction effect is obtained by the determination method of the present embodiment will be described. FIGS. 11A to 11D show four types of text images (also called images A to D). FIG. 11A shows an example of a text image in which printing amounts at ends are small. FIG. 11B shows an example of a text image in which printing amounts at ends are slightly large. FIG. 11C is an example of a text image in which printing amounts at ends are large. FIG. 11D shows an example of a text image in which printing amounts at ends are large and characters are printed in boldface. Here, the fixation target temperatures of the images are determined to evaluate power consumption on the basis of the determination method of the present embodiment.

First, the first determination of step S1001 is performed with respect to the image of FIG. 11A. Information on the ranks of printing amounts calculated from the image is shown in Table 5.

TABLE 5

| | | Main-scanning area MS | | | |
|---|---|---|---|---|---|
| | | 1 | 2 | 3 | 4 |
| Sub-scanning area SS | 1 | 1 | 3 | 3 | 1 |
| | 2 | 1 | 3 | 3 | 1 |
| | 3 | 0 | 3 | 3 | 0 |
| | 4 | 0 | 3 | 3 | 0 |
| | 5 | 0 | 3 | 2 | 0 |

Next, the ranks of the printing amounts are converted into addition amounts ΔT of the temperatures of respective regions and respective region columns to obtain Table 6. As a result, 187.5° C. is obtained as a temporary target temperature T1 determined by the first determination of the evaluation image when the correction value 17.5° C. is added to 170° C.

TABLE 6

| | | Main-scanning area MS | | | |
|---|---|---|---|---|---|
| | | 1 | 2 | 3 | 4 |
| Sub-scanning area SS | 1 | 2.5 | 3.5 | 3.5 | 2.5 |
| | 2 | 2.5 | 3.5 | 3.5 | 2.5 |
| | 3 | 0 | 3.5 | 3.5 | 0 |
| | 4 | 0 | 3.5 | 3.5 | 0 |
| | 5 | 0 | 3.5 | 3 | 0 |
| $\Delta T_{MSn}$ | | 5 | 17.5 | 17 | 5 |

Similarly, the first determination is performed with respect to the image of FIG. 11B. Information on the ranks of printing amounts calculated from the image is shown in Table 7.

TABLE 7

| | | Main-scanning area MS | | | |
|---|---|---|---|---|---|
| | | 1 | 2 | 3 | 4 |
| Sub-scanning area SS | 1 | 1 | 3 | 3 | 1 |
| | 2 | 1 | 3 | 3 | 1 |
| | 3 | 1 | 3 | 3 | 1 |
| | 4 | 1 | 3 | 3 | 1 |
| | 5 | 1 | 3 | 2 | 1 |

Next, the ranks of the printing amounts are converted into addition amounts ΔT of the temperatures of respective regions and respective region columns to obtain Table 8. As a result, 187.5° C. is obtained as a temporary target temperature T1 determined by the first determination of the evaluation image when the correction value 17.5° C. is added to 170° C.

TABLE 8

| | | Main-scanning area MS | | | |
|---|---|---|---|---|---|
| | | 1 | 2 | 3 | 4 |
| Sub-scanning area SS | 1 | 2.5 | 3.5 | 3.5 | 2.5 |
| | 2 | 2.5 | 3.5 | 3.5 | 2.5 |
| | 3 | 2.5 | 3.5 | 3.5 | 2.5 |
| | 4 | 2.5 | 3.5 | 3.5 | 2.5 |
| | 5 | 2.5 | 3.5 | 3 | 2.5 |
| $\Delta T_{MSn}$ | | 12.5 | 17.5 | 17 | 12.5 |

Similarly, the first determination is performed with respect to the image of FIG. 11C. Information on the ranks of printing amounts calculated from the image is shown in Table 9.

TABLE 9

| | | Main-scanning area MS | | | |
|---|---|---|---|---|---|
| | | 1 | 2 | 3 | 4 |
| Sub-scanning area SS | 1 | 2 | 3 | 3 | 2 |
| | 2 | 2 | 3 | 3 | 2 |
| | 3 | 2 | 3 | 3 | 2 |
| | 4 | 2 | 3 | 3 | 2 |
| | 5 | 2 | 3 | 2 | 1 |

Next, the ranks of the printing amounts are converted into addition amounts ΔT of the temperatures of respective regions and respective region columns to obtain Table 10. As a result, 187.5° C. is obtained as a temporary target temperature T1 determined by the first determination of the evaluation image when the correction value 17.5° C. is added to 170° C.

TABLE 10

| | | Main-scanning area MS | | | |
|---|---|---|---|---|---|
| | | 1 | 2 | 3 | 4 |
| Sub-scanning area SS | 1 | 3 | 3.5 | 3.5 | 3 |
| | 2 | 3 | 3.5 | 3.5 | 3 |
| | 3 | 3 | 3.5 | 3.5 | 3 |
| | 4 | 3 | 3.5 | 3.5 | 3 |
| | 5 | 3 | 3.5 | 3 | 2.5 |
| $\Delta T_{MSn}$ | | 15 | 17.5 | 17 | 14.5 |

Similarly, the first determination is performed with respect to the image of FIG. 11D. Information on the ranks of printing amounts calculated from the image is shown in Table 11.

TABLE 11

| | | Main-scanning area MS | | | |
|---|---|---|---|---|---|
| | | 1 | 2 | 3 | 4 |
| Sub-scanning area SS | 1 | 3 | 4 | 4 | 3 |
| | 2 | 3 | 4 | 4 | 3 |
| | 3 | 3 | 4 | 4 | 3 |
| | 4 | 3 | 4 | 4 | 3 |
| | 5 | 3 | 4 | 3 | 2 |

Next, the ranks of the printing amounts are converted into addition amounts ΔT of the temperatures of respective regions and respective region columns to obtain Table 12. As a result, 190° C. is obtained as a temporary target temperature T1 determined by the first determination of the evaluation image when the correction value 20° C. is added to 170° C.

TABLE 12

| | | Main-scanning area MS | | | |
|---|---|---|---|---|---|
| | | 1 | 2 | 3 | 4 |
| Sub-scanning area SS | 1 | 3.5 | 4 | 4 | 3.5 |
| | 2 | 3.5 | 4 | 4 | 3.5 |

TABLE 12-continued

| | | Main-scanning area MS | | | |
|---|---|---|---|---|---|
| | | 1 | 2 | 3 | 4 |
| | 3 | 3.5 | 4 | 4 | 3.5 |
| | 4 | 3.5 | 4 | 4 | 3.5 |
| | 5 | 3.5 | 4 | 3.5 | 3 |
| $\Delta T_{MSn}$ | | 17.5 | 20 | 19.5 | 17 |

The first determination results of the images A to D corresponding to FIGS. 11A to 11D, respectively, are summarized in Table 13.

TABLE 13

| | $\Delta T_{MS1}$ | $\Delta T_{MS2}$ | $\Delta T_{MS3}$ | $\Delta T_{MS4}$ | Temporary target temperature T1 (° C.) |
|---|---|---|---|---|---|
| Image A | 5 | 17.5 | 17 | 5 | 187.5 |
| Image B | 12.5 | 17.5 | 17 | 12.5 | 187.5 |
| Image C | 15 | 17.5 | 17 | 14.5 | 187.5 |
| Image D | 17.5 | 20 | 19.5 | 17 | 190 |

Next, the second determination of step S1002 is performed with respect to the images. The results of the second determination are shown in Table 14, and all the images are determined to be images of the pattern A, that is, text images. Then, the processing proceeds to step S1004.

TABLE 14

| | Print percentage D (%) | Numerical value X of at least lower limit threshold W (4%) continues in 10 blocks | Print percentage difference G (Threshold Y: 35) | Image type |
|---|---|---|---|---|
| Image A | 4 | None | 190 | Pattern A |
| Image B | 4.5 | None | 170 | Pattern A |
| Image C | 5 | None | 150 | Pattern A |
| Image D | 8 | None | 75 | Pattern A |

Next, a determination is made as to whether all candidate values $\Delta T_{MSn}$ are not more than 17.5° C. in step S1004. Here, the candidate values $\Delta T_{MS2}$ and $\Delta T_{MS3}$ of the image D are 20° C. and 19.5° C., respectively, and exceed 17.5° C. Accordingly, the fixation target temperature T of the image D is determined to be the temporary target temperature T1 determined by the first determination, that is, 190° C. in step S1003.

A determination is made as to whether the candidate values $\Delta T_{MS1}$ and $\Delta T_{MS4}$ of the images A to C are not more than 5° C. in step S1005. Here, both the candidate values $\Delta T_{MS1}$ and $\Delta T_{MS4}$ of the image A are 5° C. and satisfy the condition that the candidate values $\Delta T_{MS1}$ and $\Delta T_{MS4}$ are not more than 5° C. Therefore, the fixation target temperature T of the image A is determined to be the text minimum target temperature T3, that is, 170° C. in step S1006. A determination is made as to whether the candidate values $\Delta T_{MS1}$ and $\Delta T_{MS4}$ of the images B and C are not more than 12.5° C. in step S1007. Both the candidate values $\Delta T_{MS1}$ and $\Delta T_{MS4}$ of the image B are 12.5° C. and satisfy the condition that the candidate values $\Delta T_{MS1}$ and $\Delta T_{MS4}$ are not more than 12.5° C. Therefore, the fixation target temperature T of the image B is determined to be the text maximum target temperature T2, that is, 175° C. in step S1008. Further, the candidate values $\Delta T_{MS1}$ and $\Delta T_{MS4}$ of the image C are 15° C. and 14.5° C. respectively, and exceed 12.5° C. Therefore, the fixation target temperature T of the image C is determined to be the temporary target temperature T1 determined by the first determination, that is, 187.5° C. in step S1003.

Results and Effects

The above results are summarized in Table 15. In Table 15, the temperature control reduction amounts of the respective images are shown and comparable with temperature control reduction amounts in a case in which controlled temperatures are determined only by the first determination. Here, in the case of a solid black image having the highest print percentage, the ranks of the printing amounts of all regions are classified into the rank 6. Further, the necessary addition amount ΔT of the image is 4.5° C., and the candidate value $\Delta T_{MSn}$ thereof is 22.5° C. Therefore, the maximum value of a target temperature becomes 192.5° C. A value obtained by subtracting the fixation target temperature T determined by the determination method of the present embodiment from the maximum value of the target temperature is the reduction amount of temperature control according to the image data, that is, a temperature control reduction amount. Further, power consumption necessary when printing is performed at controlled temperatures determined by both methods are also shown. The power consumption is measurable by measuring power input to the heater 11 when 50 prints of respective images are fed with a power meter from a state in which the heater 11 is put in a cooling state.

TABLE 15

| | Only first determination | | Determination method of present embodiment | |
|---|---|---|---|---|
| | Temperature control reduction amount (° C.) | Power consumption (Wh) | Temperature control reduction amount (° C.) | Power consumption (Wh) |
| Image A | 5 | 14.05 | 22.5 | 12.05 |
| Image B | 5 | 14.05 | 17.5 | 12.5 |
| Image C | 5 | 14.07 | 5 | 14.07 |
| Image D | 2.5 | 14.3 | 2.5 | 14.3 |

According to the present embodiment, it appears that the temperature control reduction amounts of the images A and B are large and the power consumption thereof is small, compared with the method in which the fixation target temperatures T are calculated only by the first determination. It appears from the first determination that the images A and B have small printing amounts at the ends. In addition, it appears from the second determination that the images A and B are text images. Therefore, the temperatures of the images A and B may be largely reduced. It appears from the second determination that the image C is a text image. However, it appears from the first determination that the image C has large printing amounts at the ends. Therefore, the temperature of the image C is not largely reduced. It appears from the second determination that the image D is a text image. However, it appears form the first determination that the image D has large printing amounts at the ends, and the image D is determined to be an image in boldface. Therefore, the temperature of the image D is not largely reduced. In both the images C and D, the temporary target temperature T1 determined by the first determination is employed as a fixation target temperature.

As described above, printing information for each area and information as to whether an image is a text document are combined together to make a determination according to the present invention, whereby the character thickness, character array, and printing deviation of the text document are predicted to set an optimum target temperature. Thus, it is possible to obtain a further power consumption reduction effect compared with a conventional determination method in which a fixation target temperature is determined on the basis of the first determination, that is, printing information for each area.

MODIFIED EXAMPLES

In the present embodiment, the widths of the main-scanning areas in the direction orthogonal to the transporting direction are set to be substantially even. However, the widths of the main-scanning areas may be set to be uneven depending on the configuration or the state of the image forming apparatus. For example, when there is fear that temperatures at both ends of the film unit 10 or the pressure roller 20 reduce due to the warming-up state of the heating fixation apparatus 6, the widths in the main-scanning direction of areas at both ends may be narrowed to conduct strict management.

In the present embodiment, the same values are used for all the areas when the ranks of the printing amounts of the respective areas are converted into the addition amounts ΔT. However, weighting may be performed depending on the areas. For example, when the heater 11 locally has an area having a small heating value, the addition amount of the portion may be set on the basis of another table and have a value larger than those of other areas.

In the present embodiment, a printer that vertically feeds an A4/LTR sheet is assumed, and the total width of an image is defined as 216 mm at maximum. However, as for the horizontal feeding of an A4 sheet or a printer having a larger width, the total width of an image may be set at 297 mm or a wider width, or the number of divisions may be increased. Further, as for a B5 or A5 small-size printer, narrow settings may be applied.

In the present embodiment, the print percentages of the blocks continuous in the transporting direction are used to perform calculation in the second determination, that is, the determination method for determining whether an image is a text image. However, information such as the font, size, number, and line space of characters may be acquired from an application used to generate a document in a host computer to make a determination.

In the present embodiment, a monochrome laser beam printer is used. However, it is also possible to perform the same processing with a color laser beam printer. For example, in the case of a color laser beam printer of four colors of yellow, magenta, cyan, and black, the total number of pixels where the total density of the respective colors is at least 100% may be counted when the maximum density of the respective colors is set as 100%.

As described above, an image forming apparatus that heats and fixes toner with a fixation apparatus is enabled to reduce a fixation temperature as much as possible according to the embodiment of the present invention. Accordingly, the image forming apparatus is enabled to perform fixation at a minimum required fixation temperature and reduce power consumption.

The present invention may be grasped as an image forming apparatus that performs the processing of the embodiment, or may be grasped as an image forming method using the image forming apparatus or a method for controlling the image forming apparatus.

Further, the present invention is realizable also by processing in which a program that realizes at least one function of the embodiment is supplied to a system or an apparatus via a network or a storage medium and at least one processor in the system or the apparatus reads and performs the program. Further, the present invention is realizable also by a circuit (for example, an ASIC) that realizes at least one function.

Further, respective processing in respective embodiments may be realized by a method in which a computer performs the program. The program may be provided to the computer via, for example, a network or a computer-readable recording medium or the like that non-temporarily retains data. The program may be recorded on a computer-readable recording medium or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-029171, filed Feb. 25, 2021, which is hereby incorporated by reference wherein in its entirety.

What is claimed is:

1. An image forming apparatus comprising:

an image forming unit configured to form an image on a recording material based on image data;

a fixation unit configured to include a fixation film, a heater provided in the fixation film, and a pressure roller, wherein the fixation unit sandwiches and transports the recording material at a fixation nip between the fixation film and the pressure roller while heating the recording material to fix the image on the recording material; and a control unit configured to set a target temperature according to the image data, and control power supplied to the heater so that the temperature of the heater reaches the target temperature, wherein when the image data is a text image, the control unit sets the target temperature according to a printing amount in both end areas of a plurality of areas obtained by dividing the image data in a main-scanning direction, the control unit sets a first target temperature when the image data is not a text image, the first target temperature being determined based on the printing amount in the image data, the control unit sets a second target temperature when the image data is a text image and the printing amount in both of the end areas is greater than a first threshold value and not more than a second threshold value, and, the control unit sets a third target temperature lower than the second target temperature when the image data is a text image and the printing amount in both of the end areas is not more than the first threshold value.

2. The image forming apparatus according to claim 1, wherein the first target temperature set by the control unit is a temperature corresponding to the highest printing amount from among the printing amounts included in each of the plurality of areas obtained by dividing the image data in a main-scanning direction.

3. The image forming apparatus according to claim 1, wherein the control unit obtains a number of pixels having a density equal to or higher than a predetermined value included in the plurality of areas, and calculates the printing amount.

4. The image forming apparatus according to claim 1, wherein when the image data is a text image, the control unit determines whether a continuity of text in the text image exceeds a predetermined continuity reference in each of the plurality of areas obtained by dividing the image data in the main-scanning direction, and in a case where the continuity of the text exceeds the continuity reference in any main-scanning area, a first target temperature is set as the target temperature.

5. The image forming apparatus according to claim 1, wherein the control unit sets the target temperature lower as a continuity of text at both of the end areas is lower.

* * * * *